Dec. 21, 1948.  F. W. LEFFER  2,456,715
CONVERSION OF HYDROCARBONS
Filed Dec. 15, 1945
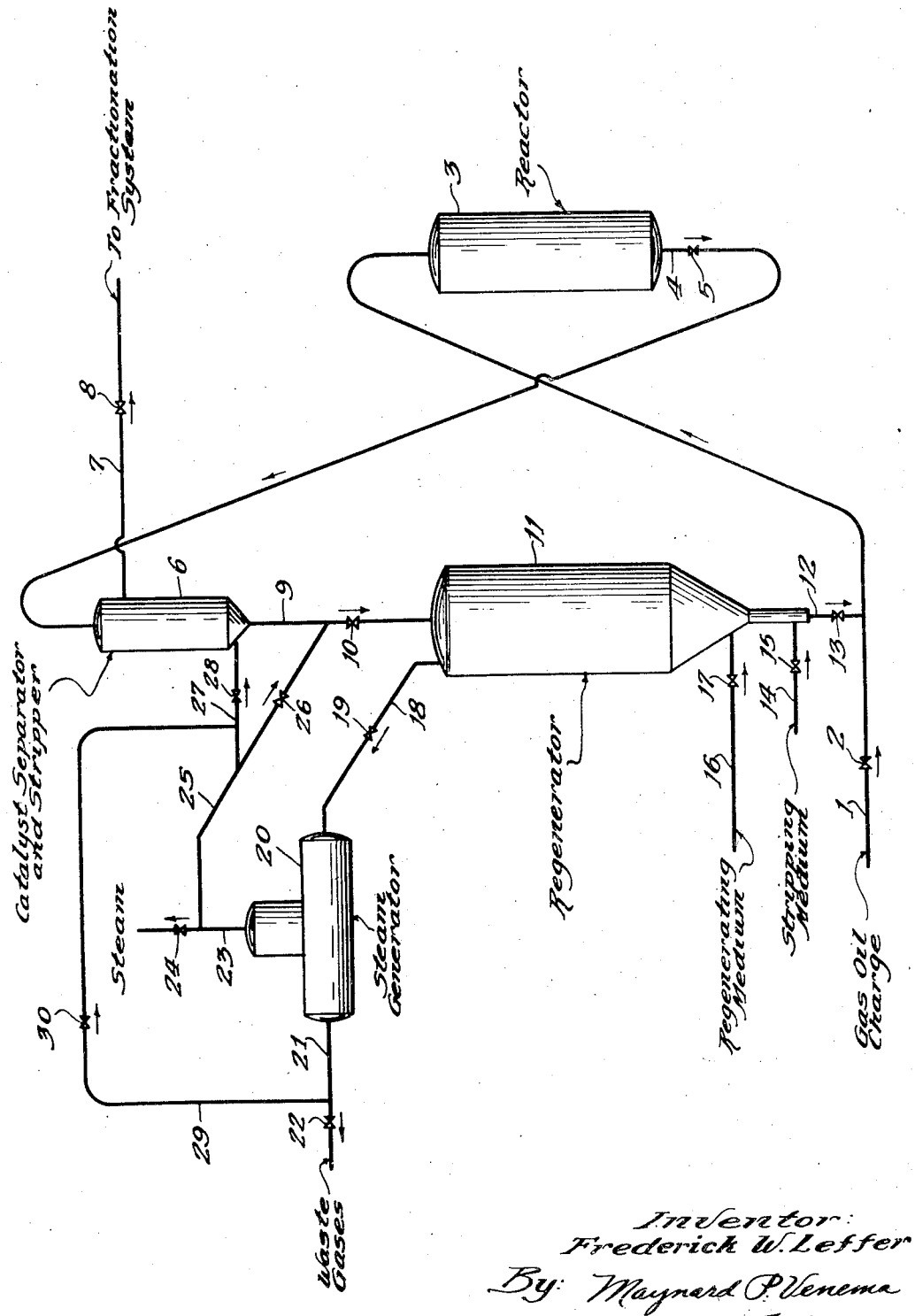
Inventor:
Frederick W. Leffer
By: Maynard P. Venema
Attorney Patented Dec. 21, 1948

2,456,715

UNITED STATES PATENT OFFICE 2,456,715

CONVERSION OF HYDROCARBONS

Frederick W. Leffer, Riverside, Ill., assignor to Universal Oil Products Company, Chicago, Ill., a corporation of Delaware Application December 15, 1945, Serial No. 635,325

11 Claims. (Cl. 196—52)

This invention is directed to an improved process for the catalytic conversion of organic compounds in the presence of a finely divided solid catalyst.

It is an object of the present invention to provide an improved method of transporting catalyst from one zone to the other in that type of operation in which the finely divided catalyst particles are continuously passed through the conversion zone in a relatively compact bed, subsequently withdrawn from the conversion zone into the regeneration zone, wherein the carbonaceous material laid down upon the catalyst during the conversion operation is removed, and the regenerated catalyst is returned to the conversion zone.

In one embodiment the present invention provides a process for the catalytic conversion of a fluid organic compound which comprises contacting said organic compound with a finely divided solid catalyst under reaction conditions in a confined reaction zone, continuously passing said catalyst and organic compound downwardly through said reaction zone, introducing contaminated catalyst suspended in the reaction product into a separation zone, wherein contaminated catalyst is separated from said reaction product and transferring said catalyst to a regeneration zone by gravitation.

The process of the present invention is applicable to various catalytic conversion operations of organic compounds, such as catalytic cracking of hydrocarbons, dehydrogenation of hydrocarbons, isomerization of olefinic hydrocarbons, oxidation of organic compounds, deolefination of olefinic gasoline, alkyl transfer reactions, and the like.

The catalysts which may be employed in the present invention for effecting several of the aforesaid reactions, such as, for example, cracking, alkyl transfer and olefin isomerization, comprise the usual catalysts, such as associations of silica with one or more of the following: aluminum oxide, zirconium oxide, boron oxide, and magnesium oxide, either synthetic or naturally occurring; or associations in the nature of alumina-boria, silica-titania, and the like. For dehydrogenation reactions, compounds of chromium, molybdenum, vanadium, and tungsten, supported on refractory supporting materials, such as, for example, alumina, silica, titanium oxide, and magnesium oxide may be employed. Other catalysts well known for the various reactions specified above may be utilized in the process of the present invention. These catalysts may be used in either the granular, pulverulent, or shaped forms such as spheres, spheroids, circular shapes, and the like.

At present, there are two types of moving bed operations which are commercially employed in organic conversion reactions. The first type of moving bed operation, commonly termed "fluidized operation," consists of passing the reactants upwardly through the catalyst bed at a rate such that hindered settling of the catalyst occurs in the reaction zone resulting in the formation of two distinct catalyst phases, namely a lower dense phase superimposed by a light phase. The lower dense phase has the appearance of a boiling liquid and the greater portion of the reaction occurs during the passage of the reactants through this catalyst phase. The fluidized type of operation is particularly advantageous in the regeneration of the catalyst in that the catalyst is rapidly circulated or agitated within the bed causing a substantial equalization of temperature therein. Since the cracking catalysts are somewhat thermophobic, the prevention of high temperature peaks during regeneration tends to increase the length of effective catalyst life.

With the other commercial type of moving bed operation, catalyst particles pass through the reaction and regeneration zones as a relatively compact mass without turbulence or fluidization of the catalyst beds. This mode of operation, as applied to the regenerating step, requires some means other than fluidization for substantially equalizing the temperature in the regeneratiton zone, so as to avoid localized zones of extremely high temperatures which would result in damage to the catalyst.

The present invention entails the use of the compact type of moving bed operation in the conversion zone and the fluidized method of operation in the regeneration zone, thus dispensing with the necessity of employing auxiliary cooling equipment to avoid excessive temperatures in the latter zone. One feature of the invention is the use of the incoming reactants as a transporting medium for the catalyst introduced from the regeneration zone into the conversion zone, and the use of the fluid reaction product as a transporting medium for the contaminated catalyst from the conversion zone into the stripping zone from which the separated catalyst is thereafter passed by gravity into the regeneration zone.

Further features of the present invention will be evident from the following description of the accompanying diagrammatic sketch, which illustrates one type of operation in which the objects of the invention can be accomplished.

To simplify the description of the drawing, the following discussion thereof will be limited to a process in which a gas oil charge is catalytically cracked in the presence of a spherical siliceous cracking catalyst such as silica-magnesium oxide or silica-alumina. However, it should be understood that the broad aspects of the invention should not be limited by this description, since the invention is applicable to many other processes as hereinabove set forth.

Referring to the drawing, the gas oil charge is introduced in line 1 containing valve 2 and is directed through a nozzle forming a jet past line 12 containing valve 13, thereby producing a low pressure area through which catalyst from regenerator 11 is introduced into the stream without passage of oil upwardly through said regenerator. The heated catalyst, upon contacting the gas oil charge causes vaporization of at least a substantial portion or the whole of the charge and a mixture of oil vapors and catalyst passes through line 1 into the upper portion of reactor 3.

The reactants entering the reactor 3 are substantially uniformly distributed over the cross-sectional area of the reactor and directed downwardly through the bed. Conversion of the reactants at the desired temperature is accomplished within the reactor as they pass downwardly through the reactor in concurrent flow with the moving solid particles of the bed. The resulting vaporous and gaseous conversion products are discharged from the lower extremity of the reaction zone along with the contaminated catalyst through line 4, containing valve 5, which may be of a streamlined plug type or of the more conventional slide or gate valve type and should be designed to permit control at this point of the rate of catalyst discharge.

The pressure maintained in reactor 3 will be sufficient to provide the necessary force to carry the vapors and catalytic particles upwardly through line 4 into catalyst separator and stripper 6, wherein the catalyst is separated from the reaction products. The reaction products separated in stripper 6 are removed through line 7 containing valve 8 to the usual fractionating system, in which gasoline and gaseous hydrocarbon components are separated from the unconverted material which can be recovered as a product of the reaction or may be recycled to the operation for further conversion. The catalyst particles from separator 6 are contacted with steam obtained as hereinafter set forth, or with another suitable stripping gas, which removes a substantial portion of the hydrocarbon material adsorbed on the catalyst prior to the introduction of the catalyst into the regeneration zone. The stripped catalyst gravitates through line 9 containing control valve 10 into the upper extremity of regenerator 11.

The regeneration of the catalyst is accomplished by passing the regenerating medium, such as air or other oxygen-containing gaseous mixtures, upwardly through the regenerator in counter-current flow to the incoming stripped catalyst. The velocity of the gaseous regenerating medium is such that hindered settling of the catalyst occurs in the regenerating zone, causing the formation of a fluidized dense bed of catalyst in the regenerator. The counter-current flow of the regenerating medium and the catalyst possesses considerable advantage over concurrent flow, in that the catalyst having the highest content of carbonaceous material is contacted with a regenerating gas having a very low oxygen content, thus providing an additional stripping section in which the more volatile carbonaceous materials are distilled from the catalyst. This method of operation not only decreases the air requirements for regeneration, but also simplifies the maintenance of low regeneration temperatures. This latter effect is of primary importance, since the catalytic materials employed are somewhat thermophobic and tend to lose activity upon overheating. The air or other oxygen-containing gas employed for regeneration is introduced through line 16 and valve 17 from some suitable compressor, or other means of obtaining the necessary pressure.

The regenerated catalyst leaving regenerator 11 may, or may not, be contacted with a stripping medium, such as steam or combustion gases of low oxygen content or hydrocarbon gases to remove oxygen adsorbed thereon, prior to admixing the heated catalyst with the incoming gas oil charge in line 1.

The combustion gases leaving regenerator 11 are directed through line 18 containing valve 19 into steam generator 20, wherein the heat content is removed by indirect heat exchange with water to form steam. The waste gases are then withdrawn from the steam generator through line 21 containing valve 22 and may be vented to the atmosphere. The evolved steam is withdrawn through line 23 and may be directed, in part, through line 25 to be employed as a stripping medium, and part or all of the steam may be removed from the system for other uses as a heating medium through valve 24. A portion of the steam withdrawn from line 25 may be directed through valve 26 to contact the contaminated catalyst in line 9, or through line 27 containing valve 28 to contact contaminated catalyst in the catalyst separator and stripper 6. Instead of using steam as a stripping medium, waste gases from line 21 may be directed through line 29 containing valve 30 into line 27.

An important feature of the present invention illustrated in the drawing is the use of the hydrocarbon reactants as a transporting medium of the catalyst from the regenerator into the reactor and the subsequent use of the reaction products to transfer the contaminated catalyst from the reactor to the catalyst separator and stripper. The stripper is positioned in such a manner over the regenerator that the catalyst contained therein is caused to flow by the hydrostatic head of the catalyst from the stripper to the regenerator without the addition of a transporting medium.

Careful pressure regulation is required when practicing the invention in the apparatus described with reference to the drawing in order that the desired flow will be obtained. The necessary pressure can be secured by regulating the inlet pressure on the gas oil charge in line 1 containing control valve 2. To prevent the flow of charge into the regenerating zone, it is essential that a jet arrangement be employed to permit the passage of catalyst from the regeneration zone into the stream of oil in line 1. If so desired, a check valve may be inserted in line 12 after the control valve 13 to preclude backflow into the regenerator 11.

The operating conditions maintained within reactor 3 will be dependent on the nature of the reaction to be accomplished, upon the particular catalyst employed, the extent of conversion desired and the charging stock utilized. When the system is employed for the catalytic cracking of hydrocarbons, the temperature will ordinarily be within the range of from about 700 to about 1000° F. under a pressure of from slightly superatmospheric to about 100 pounds per square inch gage or more. The space velocity measured as weight of hydrocarbon per unit weight of catalyst per hour may be varied from about 0.1 to about 5 and preferably from about 0.5 to 3.

The catalyst-to-oil ratio within the system ordinarily is controlled to effect a satisfactory heat balance between the endothermic reaction in the conversion zone and the exothermic reaction in the regeneration zone and will usually range from about 2:1 to about 40:1 and preferably from about 5:1 to about 15:1 (weight units of catalyst to one weight unit of charge).

When employing the system for other organic reactions such as dehydrogenation of paraffinic, naphthenic, alkyl aromatic, or olefinic hydrocarbons, the operating conditions will be somewhat similar. Slightly higher temperatures may be employed, say to about 1100° F. Higher pressures up to about 500 pounds or more may be employed when the system is employed for catalytic hydroforming, that is, the reforming of gasoline hydrocarbons in the presence of hydrogen. The conditions for oxidation reactions of hydrocarbons or other organic compounds vary greatly for different reactants so that appropriate conditions of operation will have to be chosen in relation to the particular oxidation reaction to be accomplished, and such conditions will be apparent to those familiar with this type of reaction.

I claim as my invention:

1. A catalytic conversion process which comprises introducing a suspension of solid catalyst particles in a fluid organic reactant into the upper portion of a reaction zone maintained at conversion conditions and containing a compact bed of said catalyst particles; passing said catalyst and reactant downwardly through said reaction zone and effecting conversion of said reactant therein; withdrawing the resultant reaction products together with contaminated catalyst from the lower portion of said reaction zone as a stream of catalyst suspended in said products; passing said stream, without addition thereto of any other transporting medium, to a separation zone disposed at a higher elevation than said reaction zone, the pressure in said reaction zone being maintained sufficiently high to effect the transfer of said stream to said separation zone; separating said contaminated catalyst from said reaction products in said separation zone; transferring separated contaminated catalyst by gravity flow from said separation zone to a regeneration zone disposed at substantially the same elevation as said reaction zone; passing an oxygen-containing gas upwardly through said contaminated catalyst in said regenerating zone to form a fluidized dense catalyst phase therein and removing contaminants by combustion thereof; discharging hot regenerated catalyst from said regeneration zone into a stream of said fluid organic reactant to form said first-named suspension and passing the latter directly to said reaction zone.

2. A hydrocarbon conversion process which comprises introducing a suspension of solid conversion catalyst particles in a hydrocarbon reactant into the upper portion of a reaction zone maintained at conversion conditions; passing said catalyst and reactant downwardly through said reaction zone and effecting conversion of said reactant therein; maintaining a downwardly moving compact mass of the catalyst in the reaction zone; withdrawing the resultant reaction products together with contaminated catalyst from the lower portion of said reaction zone as a stream of catalyst suspended in said products; passing said stream, without addition thereto of any other transporting medium, to a separation zone disposed at a higher elevation than said reaction zone, the pressure in said reaction zone being maintained sufficiently high to effect the transfer of said stream to said separation zone; separating said contaminated catalyst from said reaction products in said separation zone; transferring separated contaminated catalyst by gravity flow from said separation zone to a regeneration zone disposed at substantially the same elevation as said reaction zone; passing an oxygen-containing gas upwardly through said contaminated catalyst in said regenerating zone to form a fluidized dense catalyst phase therein and removing contaminants by combustion thereof; discharging hot regenerated catalyst from said regeneration zone into a stream of said hydrocarbon reactant to form said first-named suspension and passing the latter directly to said reaction zone.

3. A catalytic cracking process which comprises introducing a suspension of solid cracking catalyst particles in a hydrocarbon reactant into the upper portion of a reaction zone maintained at cracking conditions; passing said catalyst and reactant downwardly through said reaction zone and effecting substantial cracking of said reactant therein; maintaining a downwardly moving compact mass of the catalyst in the reaction zone; withdrawing the resultant cracked products together with contaminated catalyst from the lower portion of said reaction zone as a stream of catalyst suspended in said products; passing said stream, without addition thereto of any other transporting medium, to a separation zone disposed at a higher elevation than said reaction zone, the pressure in said reaction zone being maintained sufficiently high to effect the transfer of said stream to said separation zone; separating said contaminated catalyst from said products in said separation zone; transferring separated contaminated catalyst by gravity flow from said separation zone to a regeneration zone disposed at substantially the same elevation as said reaction zone; passing an oxygen-containing gas upwardly through said contaminated catalyst in said regenerating zone to form a fluidized dense catalyst phase therein and removing contaminants by combustion thereof; discharging hot regenerated catalyst from said regeneration zone into a stream of said hydrocarbon reactant to form said first-named suspension and passing the latter directly to said reaction zone.

4. A catalytic dehydrogenation process which comprises introducing a suspension of solid dehydrogenation catalyst particles in a hydrocarbon reactant into the upper portion of a reaction zone maintained at dehydrogenating conditions; passing said catalyst and reactant downwardly through said reaction zone and effecting substantial dehydrogenation of said reactant therein; maintaining a downwardly moving compact mass of the catalyst in the reaction zone; withdrawing the resultant dehydrogenation products together with contaminated catalyst from the lower portion of said reaction zone as a stream of catalyst suspended in said products; passing said stream, without addition thereto of any other transporting medium, to a separation zone disposed at a higher elevation than said reaction zone, the pressure in said reaction zone being maintained sufficiently high to effect the transfer of said stream to said separation zone; separating said contaminated catalyst from said products in said separation zone; transferring separated contaminated catalyst by gravity flow from said separation zone to a regeneration zone disposed at substantially the same elevation as said reaction zone; passing an oxygen-containing gas upwardly through said contaminated catalyst in said regenerating zone to form a fluidized dense catalyst phase therein and removing contaminants by combustion thereof; discharging hot regenerated catalyst from said regeneration zone into a stream of said hydrocarbon reactant to form said first-named suspension and passing the latter directly to said reaction zone.

5. The process of claim 3 further characterized in that said cracking catalyst comprises an association of silica and aluminum oxide.

6. The process of claim 3 further characterized in that said cracking catalyst comprises an association of silica and magnesium oxide.

7. The process of claim 3 further characterized in that said cracking catalyst comprises spheres of an association of silica and aluminum oxide.

8. The process of claim 4 further characterized in that said dehydrogenation catalyst comprises aluminum oxide and chromium oxide.

9. The process of claim 4 further characterized in that said dehydrogenation catalyst comprises aluminum oxide and molybdenum oxide.

10. The process of claim 1 further characterized in that said separated contaminated catalyst is contacted with a stripping medium, prior to regeneration, to remove adsorbed organic material.

11. The process of claim 2 further characterized in that said separated contaminated catalyst is contacted with a stripping medium, prior to regeneration, to remove adsorbed hydrocarbons.

FREDERICK W. LEFFER.

REFERENCES CITED

The following references are of record in the file of this patent:

UNITED STATES PATENTS

| Number | Name | Date |
|---|---|---|
| 2,289,329 | Prickett | July 7, 1942 |
| 2,322,019 | Hemminger | June 15, 1943 |
| 2,379,408 | Arveson | July 3, 1945 |
| 2,400,645 | Huff I | May 21, 1946 |
| 2,407,700 | Huff II | Sept. 17, 1946 |